United States Patent [19]

Sonnenberg

[11] Patent Number: 4,703,065
[45] Date of Patent: Oct. 27, 1987

[54] FOAM CUPS WITH ENHANCED COFFEE RETENTION

[75] Inventor: Fred M. Sonnenberg, Merion, Pa.

[73] Assignee: Atlantic Richfield Company, Los Angeles, Calif.

[21] Appl. No.: 11,654

[22] Filed: Feb. 5, 1987

[51] Int. Cl.$^4$ ............................ C07J 9/22; B05D 7/00
[52] U.S. Cl. ........................................ 521/57; 427/222; 428/35; 428/407; 521/146; 521/147
[58] Field of Search .......................... 521/57; 427/222; 428/35, 407

[56] References Cited

U.S. PATENT DOCUMENTS

| | | |
|---|---|---|
| 2,989,782 | 6/1961 | Barklniff, Jr. et al. ............... 521/57 |
| 3,590,014 | 6/1971 | Burt ....................................... 521/57 |
| 4,361,656 | 11/1982 | Mostafa ................................. 521/57 |
| 4,588,751 | 5/1986 | Ingram ................................... 521/57 |

Primary Examiner—Morton Foelak
Attorney, Agent, or Firm—Dennis M. Kozak

[57] ABSTRACT

Enhanced coffee retention properties are achieved in thermoplastic polymer foam cups molded from thermoplastic polymer particles by coating at least a portion of the surfaces of the particles before molding with a fluorosurfactant.

5 Claims, No Drawings

FOAM CUPS WITH ENHANCED COFFEE RETENTION

This invention relates to molded thermoplastic foam cups.

More specifically, this invention pertains to molded thermoplastic foam cups which exhibit enhanced coffee retention properties.

The manufacture of molded articles, e.g., cups from expanded thermoplastic particles is well known. The most commonly used thermoplastic particles are expandable polystyrene beads known as EPS. Typically, polystyrene beads are impregnated with a blowing agent which boils below the softening point of the polystyrene and causes the impregnated beads to expand when they are heated. When the impregnated beads are heated in a mold cavity, they expand to fill the cavity and fuse together to form a shaped article.

The formation of molded articles, e.g., cups from impregnated polystyrene beads, is generally done in two steps. First, the impregnated polystyrene beads are pre-expanded to a density of from about 2 to about 12 pounds per cubic foot. Second, the expanded beads or "prepuff" are heated in a closed mold to further expand the prepuff and to form a fused article having the shape of the mold. The second step is generally referred to as "molding."

The pre-expansion step is conventionally carried out by heating the impregnated beads using any conventional heating medium such as steam, hot air, hot water, or radiant heat. One generally accepted method for accomplishing the pre-expansion of impregnated thermoplastic particles is taught in U.S. Pat. No. 3,023,175 to Rodman.

In the manufacture of foam cups, the preferred thermoplastic is expandable polystyrene beads. The polystyrene beads used to make foam cups are generally prepared by an aqueous suspension polymerization process which results in beads that can be screened to relatively precise bead sizes. Typically, bead diameters are within the range of from about 0.008 to about 0.02 inch.

In spite of careful bead size control, one problem which continues to plague the molded cup industry is that cups molded from expandable polystyrene beads exhibit a tendency to leak coffee. The leakage results from penetration of the coffee around the fused polystyrene beads. The present invention provides a molded foam cup which exhibits exhanced coffee retention.

According to this invention, it has been found that if at least a portion of the surfaces of the thermoplastic beads is coated with a fluorosurfactant, cups molded therefrom exhibit enhanced coffee retention as compared to cups molded from the same expanded thermoplastic beads in the absence of the fluorosurfactant coating.

In the practice of this invention, any suitable thermoplastic homopolymer or copolymer can be employed. Particularly suitable for use are homopolymers derived from vinyl aromatic monomers including styrene, isopropylstyrene, alpha-methylstyrene, nuclear methylstyrenes, chlorostyrene, tert-butylstyrene, and the like, as well as copolymers prepared by the copolymerization of at least one vinyl aromatic monomer with monomers such as butadiene, alkyl methacrylates, alkyl acrylates, acrylonitrile, and maleic anhydride, wherein the vinyl aromatic monomer is present in at least 50% by weight of the copolymer. Styrenic polymers are preferred, particularly polystyrene.

The polymer used in this invention must be in the form of beads, granules, or other particles convenient for the expansion and molding operations. Beads formed from an aqueous suspension process are essentially spherical and are preferred for molding foam cups.

The polymer particles are impregnated using any conventional method with a suitable blowing agent. For example, the impregnation can be achieved by adding the blowing agent to the aqueous suspension during the polymerization of the polymer, or alternatively by resuspending the polymer particles in an aqueous medium and then incorporating the blowing agent as taught in U.S. Pat. No. 2,983,692 to D'Alelio. Any gaseous material or material which will produce gases on heating can be used as the blowing agent. Conventional blowing agents include aliphatic hydrocarbons containing 4 to 6 carbon atoms in the molecule, such as butanes, pentanes, hexanes, and the halogenated hydrocarbons which boil at a temperature below the softening point of the polymer chosen.

Fluorosurfactants suitable for use to coat the expandable polymer particles are represented by the following general formula:

$$R-CH_2-X,$$

wherein R represents a perfluoroalkyl group having from 6 to 16 carbon atoms; wherein X represents $-CH_2SCH_2CH_2CO_2Li$, $-CH_2SO_3H$, $-CH_2SO_3NH_4$, $-CH_2O(CH_2CH_2O)_xH$, $-CH_2O(CH_2CH_2O)_yH$, $-CH_2SCH_2CH_2N^+(CH_3)_3CH_3SO_4^-$, $-CH(OCOCH_3)CH_2N^+(CH_3)_2CH_2CO_2^-$, and

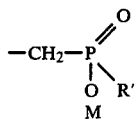

and wherein x represents an integer from 8 to 14, y represents an integer from 4 to 7, R' represents $-OCH_2CH_2R$ or $-OM$, and M represents $-H$, $-NH_4$, or $-NH_2(CH_2CH_2OH)_2$.

Fluorosurfactants having the above general formula are commercially available from E. I. DuPont under the trademark ZONYL ®.

ZONYL fluorosurfactants grades FSA (50% solids), FSP (35% solids), FSE (10% solids), RP, NF, UR (100% solids), FSJ (40% solids), TBS (33% solids), FSN (40% solids), FSN-100 (100% solids), FSO (50% solids), FSO-100 (100% solids), FSC (50% solids), and FSK (47% solids) are suitable for use in this invention. The ZONYL fluorosurfactants are typically supplied in diluents. All amounts by weight of ZONYL fluorosurfactant listed herein are based on 100% solids unless stated otherwise. The typical diluents are water/ethylene glycol, water/isopropyl alcohol, or water/acetic acid. ZONYL FSP is preferred and is supplied as 35% solids in water/isopropyl alcohol (45:20) solution.

The fluorosurfactant can be coated onto the polymer particles using any suitable method. For example, the fluorosurfactant can be applied by blending the polymer particles with the fluorosurfactant in a suitable mixer, e.g., a high intensity mixer, a low intensity ribbon blender, or a drum mixer. Alternatively, the fluorosurfactant can be applied during the impregnation of the polymer particles by adding it along with the blowing agent.

Enhanced coffee retention has been observed when as little as about 0.01 part by weight fluorosurfactant (100% solids) is employed per each 100 parts by weight of polymer particles. Using more than about 0.25 part by weight of fluorosurfactant (100% solids) has not been found to impart any significant enhancement in the coffee retention of molded cups.

Moreover, the entire surface of the particles does not need to be completely coated. It is adequate for the purposes of this invention if at least a portion of the surfaces of the particles are coated with fluorosurfactant. In the practice of this invention, the fluorosurfactant in diluent solution is coated on at least a portion of the surfaces of the beads, and the diluent is removed, leaving a thin film coating of the fluorosurfactant on the bead. The following examples further demonstrate the invention.

EXAMPLE 1

This example demonstrates the preparation of fluorosurfactant coated polystyrene beads and foam cups produced therefrom. The polystyrene beads were coated with fluorosurfactant by blending. Five samples (A–E) were separately prepared using the following procedure:

To 300 g of n-pentane impregnated polystyrene beads having bead diameters within the range of from about 0.008 to about 0.02 inch was added the amount and type of fluorosurfactant shown in column 2 of following Table 1. The mixture of impregnated beads and fluorosurfactant was tumble blended in a glass jar for about 15 minutes, and then about 0.24 g of zinc stearate, a mold release agent, was added. The mixture was further tumble blended for about a half hour.

The impregnated, fluorosurfactant-coated beads were pre-expanded in a Buccaneer expander to the density shown in column 3 of following Table 1 and allowed to age for at least 2 hours before being molded into cups.

Cup molding was carried out using a 6 W smooth wall mold which produces a 6 oz. cup. The cup molding machine was set to a steam header pressure of 120 psi and a back pressure of 35 psi. The total molding cycle took 6.43 seconds per cup and consisted of fill time 0.85 second, dwell time 0.65 second, cook time 1.70 seconds, and cool time 3.25 seconds. Forty cups were molded from each sample and allowed to age overnight before testing.

Ten cups of each sample were subjected to coffee retention testing as follows: Coffee at 190° F. was poured into each cup and the side walls and bottom of each cup containing coffee was observed for coffee stains or leakage every 15 minutes over a 2 hour period.

The mean time to failure (MTF) of each ten cup sample was calculated by adding the time to failure for each cup (the 15 minute period during which a cup exhibits leakage or staining is recorded as the time to failure for that cup) and dividing the total time by the number of cups tested. The maximum MTF value if none of the ten cups in a sample exhibited any stain or leakage is 2.0 hours. The minimum MTF value if all ten cups fail within the first 15 minutes is 0.25 hour.

Coffee retention testing was repeated on a second set and a third set of ten cups of each of the five samples 2 weeks and 1 month after the first test. The results of the coffee retention testing is set forth in following Table 1.

TABLE 1

| Sample | Fluorosurfactant (wt %) | Density | Coffee Retention After Aging (MTF)[2] | | |
|---|---|---|---|---|---|
| | | | 1 Day | 2 Week | 1 Month |
| Control | None | 4.07 | 0.43[2] | 0.35 | 0.45 |
| A | ZONYL FSP[1] (0.01) | 4.03 | 0.43 | 0.35 | 0.50 |
| B | ZONYL FSP (0.05) | 3.86 | 1.75 | 1.00 | 1.30 |
| C | ZONYL FSP (0.075) | 3.94 | 1.88 | 1.70 | 2.00 |
| D | ZONYL FSP (0.10) | 3.87 | 1.58 | 1.85 | 2.00 |
| E | ZONYL FSP (0.15) | 3.59 | 1.27 | 0.88 | 0.80 |

1. ZONYL FSP Fluorosurfactant is represented by the following formula:

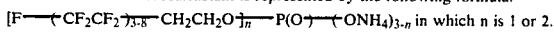

[F—(CF$_2$CF$_2$)$_{3-8}$—CH$_2$CH$_2$O]$_{\overline{n}}$—P(O)(ONH$_4$)$_{3-n}$, in which n is 1 or 2.

2. Mean Time to Failure of a ten cup sample in hours.

EXAMPLE 2

This example demonstrates the invention using substantially the procedure of Example 1 and compares the difference in coffee retention achieved using three different fluorosurfactants. Three samples (F–H) and a control were prepared.

The amount and type of fluorosurfactant used and the results of the coffee retention testing are shown in following Table 2.

TABLE 2

| Sample | Fluorosurfactant (wt %) | Density | Coffee Retention After Aging (MTF) | | |
|---|---|---|---|---|---|
| | | | 1 Day | 2 Week | 1 Month |
| Control | None | 3.96 | 0.43 | 0.25 | 0.25 |
| F | ZONYL FSE[1] (0.075) | 3.77 | 0.48 | 0.45 | 0.40 |
| G | ZONYL RP[2] (0.15) | 3.84 | 0.65 | 0.50 | 0.38 |
| H | ZONYL FSP (0.15) | 3.59 | 1.27 | 0.88 | 0.80 |

1. ZONYL FSE Fluorosurfactant is nominally the same as ZONYL FSP (See Example 1, Note 1).

2. ZONYL RP Fluorosurfactant is represented by the following formula:

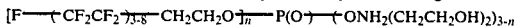

[F—(CF$_2$CF$_2$)$_{3-8}$—CH$_2$CH$_2$O]$_{\overline{n}}$—P(O)(ONH$_2$(CH$_2$CH$_2$OH)$_2$)$_{3-n}$

EXAMPLE 3

This example demonstrates another method for coating polystyrene beads with fluorosurfactant and describes introduction of fluorosurfactant during the impregnation of the polystyrene beads.

To a soda pop bottle containing 100 g of unimpregnated polystyrene beads having diameters within the range of from about 0.009 to about 0.03 inch is added about 97 ml of distilled water, about 2.0 g of a suspending agent (tricalcium phosphate), about 2.0 ml of soap (sodium dodecylbenzene sulfonate), about 0.3 g of a 35% fluorosurfactant solution (ZONYL® FSP), and about 7.8 g of n-pentane blowing agent.

The contents of the bottle are tumbled end over end in an oil bath and heated to about 105° C. After remaining at 105° C. for about 2 hours, the contents are cooled to room temperature, the bottle is opened, and the contents acidified to a pH of about 1.0.

The beads are retained in the acid for about 15 minutes, and then washed with water, centrifuged, and tray dried for about 4 hours. The resulting beads are recovered with at least a portion of their surfaces coated with fluorosurfactant and are tested for coffee retention according to the procedure set out in Example 1. Cups molded from the resulting beads which are at least partially coated with fluorosurfactant exhibit enhanced coffee retention as compared to beads prepared identically but in the absence of the fluorosurfactant.

It will be evident from the foregoing that various modifications can be made to this invention. Such, however, are considered as being within the scope of the invention.

What is claimed is:

1. A method for enhancing the coffee retentiveness of molded foam cups made from foamable styrene polymer particles which have been impregnated with a blowing agent which comprises coating the thermoplastic polymer particles with an effective amount of a fluorosurfactant having the general formula $$R-CH_2-X,$$

wherein R represents a perfluoroalkyl group having from 6 to 16 carbon atoms; wherein X represents —CH$_2$SCH$_2$CH$_2$CO$_2$Li, —CH$_2$SO$_3$H, —CH$_2$SO$_3$NH$_4$, —CH$_2$O(CH$_2$CH$_2$O)$_x$H, —CH$_2$O(CH$_2$CH$_2$O)$_y$H, —CH$_2$SCH$_2$CH$_2$N$^+$(CH$_3$)$_3$CH$_3$SO$_4^-$, —CH(OCOCH$_3$)CH$_2$N$^+$(CH$_3$)$_2$CH$_2$CO$_2^-$, and

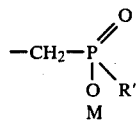

and wherein x represents an integer from 8 to 14, y represents an integer from 4 to 7, R' represents —OCH$_2$CH$_2$R or —OM, and M represents —H, —NH$_4$, or —NH$_2$(CH$_2$CH$_2$OH)$_2$, said fluorosurfactant being present in sufficient quantity to retard the rate at which coffee leaks through said molded foam cups as compared to the rate at which coffee leaks in the absence of said fluorosurfactant.

2. The method of claim 1 in which said fluorosurfactant is employed in an amount from about 0.01 to about 0.25 part by weight (100% solids) per each 100 parts by weight of said foamable thermoplastic particles.

3. The method of claim 1 in which the fluorosurfactant is coated on the styrene polymer particles before the step of impregnating the particles with a blowing agent by blending.

4. The method of claim 1 in which the fluorosurfactant is coated on the styrene polymer particles after the step of impregnating the polymer particles with a blowing agent by blending.

5. The method of claim 1 in which the fluorosurfactant is coated on the polymer particles by introducing the fluorosurfactant during the step of impregnating the styrene polymer particles with a blowing agent.

* * * * *

UNITED STATES PATENT AND TRADEMARK OFFICE
CERTIFICATE OF CORRECTION

PATENT NO. : 4,703,065
DATED : October 27, 1987
INVENTOR(S) : Fred M. Sonnenberg Page 1 of 2

It is certified that error appears in the above-identified patent and that said Letters Patent is hereby corrected as shown below:

The structural formula of X in Column 2, lines 36-42 and in claim 1, column 6 is changed from

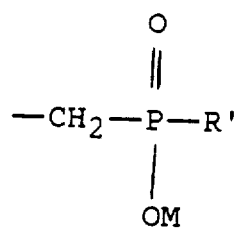

UNITED STATES PATENT AND TRADEMARK OFFICE
CERTIFICATE OF CORRECTION

PATENT NO. : 4,703,065

DATED : October 27, 1987

INVENTOR(S) : Fred M. Sonnenberg

It is certified that error appears in the above-identified patent and that said Letters Patent is hereby corrected as shown below:

to

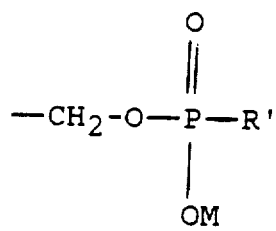

Signed and Sealed this

Twelfth Day of July, 1988

Attest:

DONALD J. QUIGG

Attesting Officer

Commissioner of Patents and Trademarks